(12) United States Patent
Nakane

(10) Patent No.: US 11,506,603 B2
(45) Date of Patent: Nov. 22, 2022

(54) OPTICAL CELL AND GAS ANALYZER

(71) Applicant: HORIBA, LTD., Kyoto (JP)

(72) Inventor: Masahiro Nakane, Kyoto (JP)

(73) Assignee: HORIBA, LTD., Kyoto (JP)

( * ) Notice: Subject to any disclaimer, the term of this patent is extended or adjusted under 35 U.S.C. 154(b) by 772 days.

(21) Appl. No.: 16/418,465

(22) Filed: May 21, 2019

(65) Prior Publication Data

US 2019/0360931 A1 Nov. 28, 2019

(30) Foreign Application Priority Data

May 22, 2018 (JP) .............................. JP2018-098135

(51) Int. Cl.
*G01N 21/53* (2006.01)
*G01N 21/39* (2006.01)

(52) U.S. Cl.
CPC ..... *G01N 21/534* (2013.01); *G01N 2021/391* (2013.01)

(58) Field of Classification Search
CPC ............... G01N 21/534; G01N 21/031; G01N 21/0332; G01N 21/39; G01N 21/3504; G01N 2021/391; G01N 2021/151
See application file for complete search history.

(56) References Cited

U.S. PATENT DOCUMENTS

| | | | | |
|---|---|---|---|---|
| 3,981,176 A * | 9/1976 | Jacobs | ................... | G01N 29/02 73/24.01 |
| 2014/0002823 A1* | 1/2014 | Nakatani | ................ | G01N 21/05 356/439 |
| 2017/0010207 A1 | 1/2017 | Fetzner et al. | | |

FOREIGN PATENT DOCUMENTS

| | | |
|---|---|---|
| EP | 2685230 A1 | 1/2014 |
| JP | 60-233536 A | 11/1985 |
| JP | S6191542 A | 5/1986 |
| JP | 09-101257 A | 4/1997 |
| JP | 2000-002656 A | 1/2000 |
| JP | 3268966 B | 3/2002 |
| JP | 2017-504028 A | 2/2017 |
| JP | 2017-194458 A | 10/2017 |
| JP | 2018-509598 A | 4/2018 |
| WO | 2012-120957 A1 | 9/2012 |
| WO | 2016-118431 A1 | 7/2016 |

OTHER PUBLICATIONS

EESR dated Sep. 9, 2019 issued for European Patent Application No. 19 175 976.0, 13 pgs.

(Continued)

*Primary Examiner* — Tarun Sinha

(74) *Attorney, Agent, or Firm* — Brooks Kushman P.C.

(57) ABSTRACT

The optical cell of an elongated shape has an inner space into which gas is introduced and includes: a cell main body forming the inner space; a manifold member being separably connected to an outer surface of the cell main body extending in a longitudinal direction; and a heating mechanism heating the manifold member, in which the cell main body has a through hole penetrating from the outer surface into the inner space, and the manifold member has a gas introduction path extending along the longitudinal direction and guiding the gas, which has been taken in from the outside, from one side to another side in the longitudinal direction and then guiding the gas to the inner space through the through hole.

10 Claims, 7 Drawing Sheets

OTHER PUBLICATIONS

Office Action dated Apr. 26, 2022 issued in JP patent application No. 2018-098135, 10 pgs.
Office Action dated Jun. 9, 2022 issued in EP patent application No. 19 175 976.0, 6 pgs.

* cited by examiner

OPTICAL CELL AND GAS ANALYZER

CROSS-REFERENCE TO RELATED APPLICATION

This application claims priority to Japanese Application No. 2018-098135, filed May 22, 2018, the disclosure of which is incorporated in its entirety by reference herein.

TECHNICAL FIELD

The present invention relates to an optical cell and a gas analyzer.

BACKGROUND ART

For example, Patent Literature 1 discloses, as a conventional gas analyzer, a gas analyzer which includes an optical cell of an elongated shape having an inner space, into which sample gas is introduced, and which includes: a sample gas introduction path for introducing sample gas from the outside into the inner space; a purge gas introduction path for introducing purge gas from the outside into the inner space; a gas lead-out path for leading out the sample gas and the purge gas, which have been introduced into the inner space, to the outside; a light source which emits light towards the inner space of the optical cell; and a light detector which detects the light emitted from the inner space of the optical cell.

In the gas analyzer of this type, analysis needs to be performed in a state in which a temperature of the sample gas introduced into the inner space is maintained at a predefined set value. However, in the gas analyzer according to Patent Literature 1 described above, in a case where there is a temperature difference between the sample gas and the purge gas introduced into the inner space, the inner space heated to a high temperature by the sample gas is cooled by the purge gas upon execution of purge operation. Thus, introducing the sample gas into the inner space again for the analysis requires standby time for the temperature of the inner space to increase to a set value, which consequently has raised a problem that the analysis cannot be performed continuously.

Further, continuous long-term use of the gas analyzer of this type causes adhesion of a component of the sample gas to an inner surface of the sample gas introduction path, and thus gas replacement speed decreases, which consequently raises a problem of responsivity deterioration.

Moreover, the gas analyzer of this type is used for, for example, analysis of a component of exhaust gas exhausted from an engine of an automobile or the like. In this case, continuous analysis is performed while the exhaust gas exhausted from the engine is introduced into the optical cell, and while checking an engine state against the component of the exhaust gas in the aforementioned engine state, the component of the exhaust gas in each engine state is judged. Then a decrease in an amount of the gas introduced into the inner space by the sample gas introduction path in such a mode of use results in a greater difference between timing at which the exhaust gas is exhausted from the engine and timing at which the exhaust gas is analyzed, raising a problem that accurate judgement on the component of the exhaust gas in each engine state cannot be made.

However, in the gas analyzer according to Patent Literature 1 described above, the sample gas introduction path is integrally connected to the optical cell and thus the sample gas introduction path cannot easily be removed from the optical cell, which has resulted in difficulties in easily resolving the decrease in the amount of the gas introduced into the inner space by the sample gas introduction path.

CITATION LIST

Patent Literature

[Patent Literature 1] Japanese Unexamined Patent Application Publication No. S60-233536

SUMMARY OF INVENTION

Technical Problem

Thus, it is a main object of the present invention to provide an optical cell capable of easily resolving a decrease in an amount of gas introduced into an inner space by a gas introduction path and also capable of providing a relatively small temperature difference between various types of gas introduced into the inner space.

Solution to Problem

Specifically, an optical cell according to one aspect of the present invention has an inner space into which gas is introduced and includes: a cell main body forming the inner space; a manifold member being connected to an outer surface of the cell main body extending in a longitudinal direction; and a heating mechanism heating the manifold member, in which the cell main body has a through hole penetrating from the outer surface into the inner space, and the manifold member has at least one gas introduction path extending along the longitudinal direction and, guiding the gas, which has been taken in from the outside, from one side to another side in the longitudinal direction and then guiding the gas to the inner space through the through hole.

With such configuration, the manifold member having the at least one gas introduction path can easily be separated from the cell main body, and thus a problem caused by clogging of the at least one gas introduction path can easily be resolved through replacement of the manifold member. Moreover, the gas is guided from the one end side to the another end side of the inner space in the longitudinal direction by the at least one gas introduction path, so that the gas flowing through the at least one gas introduction path is heated by the heating mechanism for relatively long time. Consequently, for example, even in a case where a temperature difference between the sample gas taken in from the outside and the purge gas is large, the gas is adjusted to the same temperature while reaching the inner space through the at least one gas introduction path. Consequently, a temperature rising period after purge operation can be shortened, which permits quick measurement. Preparation of a manifold member which has one end communicating with the outside of the at least one gas introduction path and being provided at a different posit on permits a change in the manifold member in view of piping of each device connected to the optical cell. This consequently makes it easy to route the piping.

Moreover, in order to suppress gas staving in part of the inner space, an introduction position at which the gas is introduced into the inner space and a lead-out position at which the gas is led out from the inner space may be separated from each other.

More specifically, the cell main body ma have a pair of through holes arranged separately from each other in the longitudinal direction, and the manifold member may have the at least one gas introduction path for introducing the gas, which has been taken in from the outside, into the inner space through one of the through holes and further may have a gas lead-out path for leading out the gas, which has been introduced into the inner space, to the outside through another one of the through holes.

Moreover, the gas lead-out path and the at least one gas introduction path may have, on either one side of the manifold member in the longitudinal direction, one end communicating with the outside.

With such configuration, the one end of the at least one gas introduction path and the one end of the gas derivation path both of which communicate with the outside can be collectively arranged at one portion of the manifold member. Consequently, is easy to route the piping from each device connected to the optical cell 20.

Moreover, different gas introduction paths may be provided for sample gas and purge gas. More specifically, the at least one gas introduction path includes a plurality of gas introduction paths, the manifold member may have two gas introduction paths, one of which is a sample gas introduction path for guiding sample gas and another one of which is a purge gas introduction path for guiding purge gas, and the heating mechanism may heat the sample gas introduction path and the purge gas introduction path.

In this case, the purge gas introduction path may branch, in the middle, into two branch paths one of which guides the purge gas to either one side of the inner space in the longitudinal direction and another one of which guides the purge gas to another side of the inner space in the longitudinal direction.

With such configuration, the purge gas can be introduced into the inner space from a position separated from the inner space in the longitudinal direction. Consequently, the entire inner space can evenly be purged.

Moreover, configuration may be provided such that in a case where the manifold member connected to the cell main body is rotated through 180 degrees where an axial line passing through a center of a straight line being orthogonal to the outer surface of the cell main body and linking together the pair of through holes is provided as a rotation axis, switching occurs, through the rotation, between the through hole communicating with the at least one gas introduction path and the through hole communicating with the gas lead-out path.

With such configuration, the manifold member be connected to the cell main body even when rotated through 180 degrees. Consequently, positions of one end (a port) of the at least one gas introduction path and, one end (a port) of the gas lead-out path both of which communicate with the outside can be switched, increasing a degree of freedom in the piping of the optical cell and each device.

In the gas analyzer of this type, positions at which the various types of gas are introduced into the inner space have influences on accuracy in sample gas measurement. That is, for example, in a case where the position at which the purge gas is introduced into the inner space is inappropriate, contamination of the inner space by the sample gas cannot sufficiently be purged, having adverse influences on accuracy in subsequent sample gas measurement. Moreover, in a case where the position at which the sample gas is introduced into the inner space is inappropriate, the sample gas stays in part of the inner space, thereby causing adverse influences on the accuracy in the sample gas measurement.

Thus, like the optical cell according to one aspect of the present invention, an optical cell may have an inner space into which gas is introduced and may include: at least two cell elements forming the inner space; and a heating mechanism heating one of the two cell elements, in which the one cell element has at least one gas introduction path extending along a longitudinal direction and guiding the gas, which has been taken in from the outside, from one side to another side in the longitudinal direction and then guiding the gas to the inner space.

With such configuration, replacement of the one cell element makes it easy to change the position at which the gas is introduced into the inner space.

Moreover, in this case, the one cell element further may have a gas lead-out path for guiding the gas, which has been introduced into the inner space, to the outside, and one end of the at least one gas introduction path and one end of the gas lead-out path both of which communicate with the inner space may be arranged separately from each other in the longitudinal direction of the one cell element.

Moreover, a gas analyzer according to still another aspect of the present invention include& the optical cell described above; a light source emitting light towards the inner space of the optical cell; a light detector detecting the light emitted from the inner space; and an information processor analyzing the gas based on a light intensity signal detected by the light detector.

Advantageous Effects of Invention

With the optical cell having the aforementioned configuration, the positions at which the various types of gas are introduced into the inner space can easily be changed and a temperature difference between the various types of gas introduced into the inner space can be made relatively small.

DESCRIPTION OF EMBODIMENTS

Hereinafter, a gas analyzer according to the present invention will be described pith reference to the drawings.

A gas analyzer 100 of the present embodiment analyses, for example, sample gas such as exhaust gas exhausted from an inner combustion engine by using an infrared spectroscopy such as NDIR. Note that the gas analyzer according to the present embodiment can also be used for analyzing gas (sample gas) other than the exhaust gas.

First Embodiment

Figure 1:
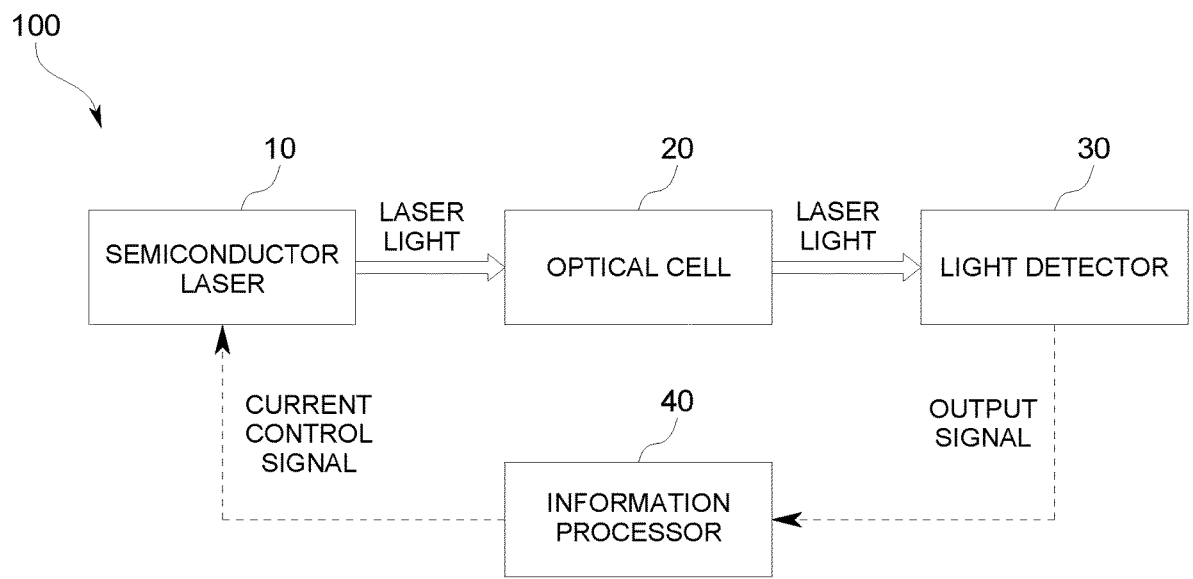
FIG. 1 is a schematic diagram illustrating an overall configuration of a gas analyzer according to a first embodiment.

More specifically, the gas analyzer 100 according to the present embodiment includes: as illustrated in FIG. 1, a semiconductor laser 10 (hereinafter also referred to as light source 10) serving as a light source; an optical cell 20 into which the sample gas is introduced and also which causes multireflection of light from the semiconductor laser 10); a light detector 30 which detects the light exiting from the optical cell 20; and an information processor 40 which analyzes a component contained in the sample gas based on a light intensity signal detected by the light detector 30. Note that the gas analyzer 100 according to the present invention has a distinctive optical cell 20, and various parts other than the optical cell 20 will be first described.

The semiconductor laser 10 here is a quantum cascade laser (QCL) as one type of the semiconductor laser 10 and oscillates mid infrared (4 μm to 10 μm) laser light. The semiconductor laser 10 is capable of modulating (varying) an oscillation wavelength by a given current (or voltage). Note that as long as the oscillation wavelength is variable, another type of a laser may be used, and a temperature may be varied to vary the oscillation wavelength.

The light detector 30 used here is of a thermal type such as a relatively low-cost thermopile, but another type, for example, a responsive quantum photoelectric device of HgCdTe, InGaAs, InAsSb, or PbSe may be used.

The information processor 40 includes: an analog electric circuit including a buffer, an amplifier, etc.; a digital electric circuit including a CPU, a memory, etc.; an AD converter and a DA converter which intervene between the analog and digital electric circuits; and the like. Through cooperation of the CPU and surrounding devices of the CPU in accordance with a predetermined program stored in a predetermined region of the memory, the information processor 40 exerts a function of receiving an output signal from the light detector 30 and performing arithmetic processing on a value of the output signal to calculate concentration of the component to be measured.

Next, the distinctive optical cell 20 of the gas analyzer 100 according to the present embodiment will be described in detail.

Figure 2:
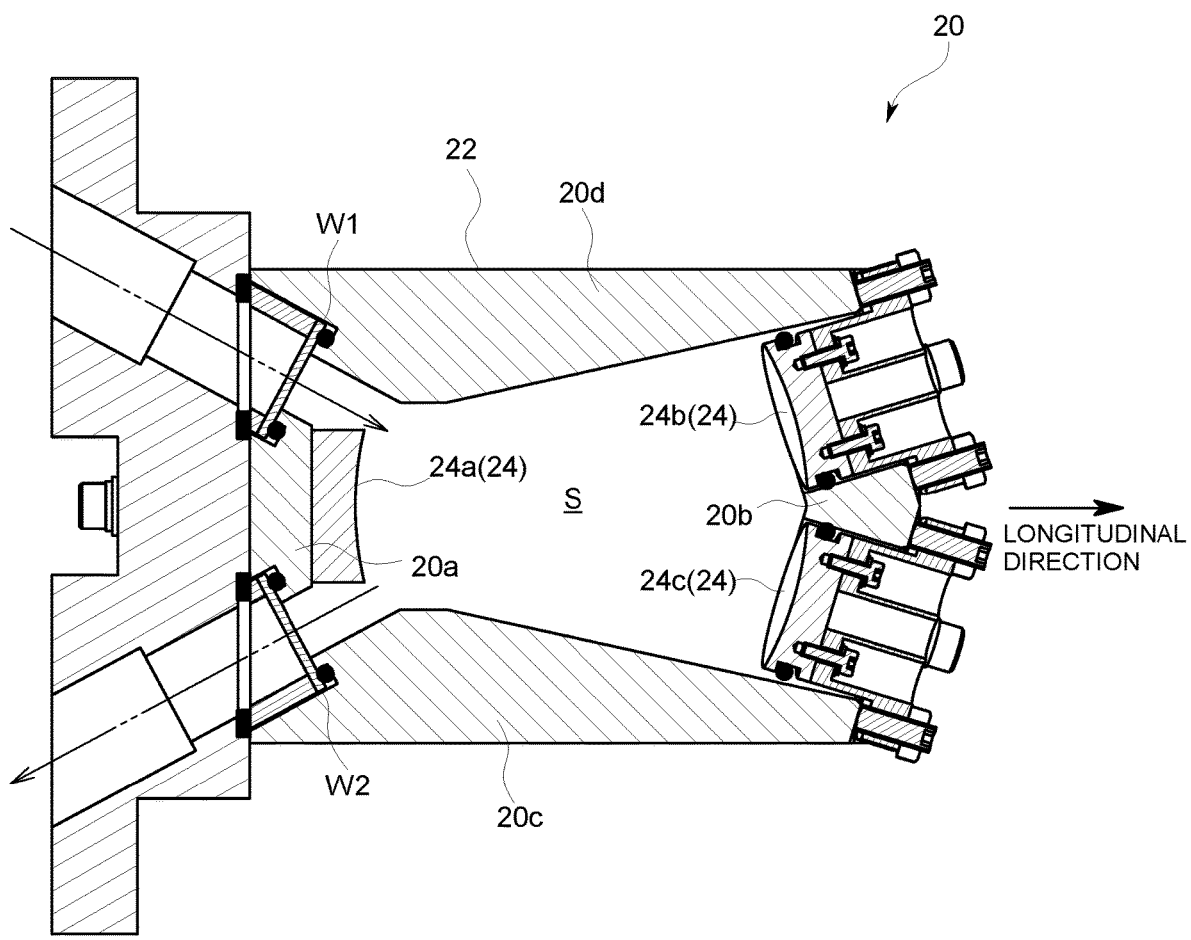
FIG. 2 is a sectional view schematically illustrating an optical cell of the gas analyzer according to the same embodiment.
Figure 3:
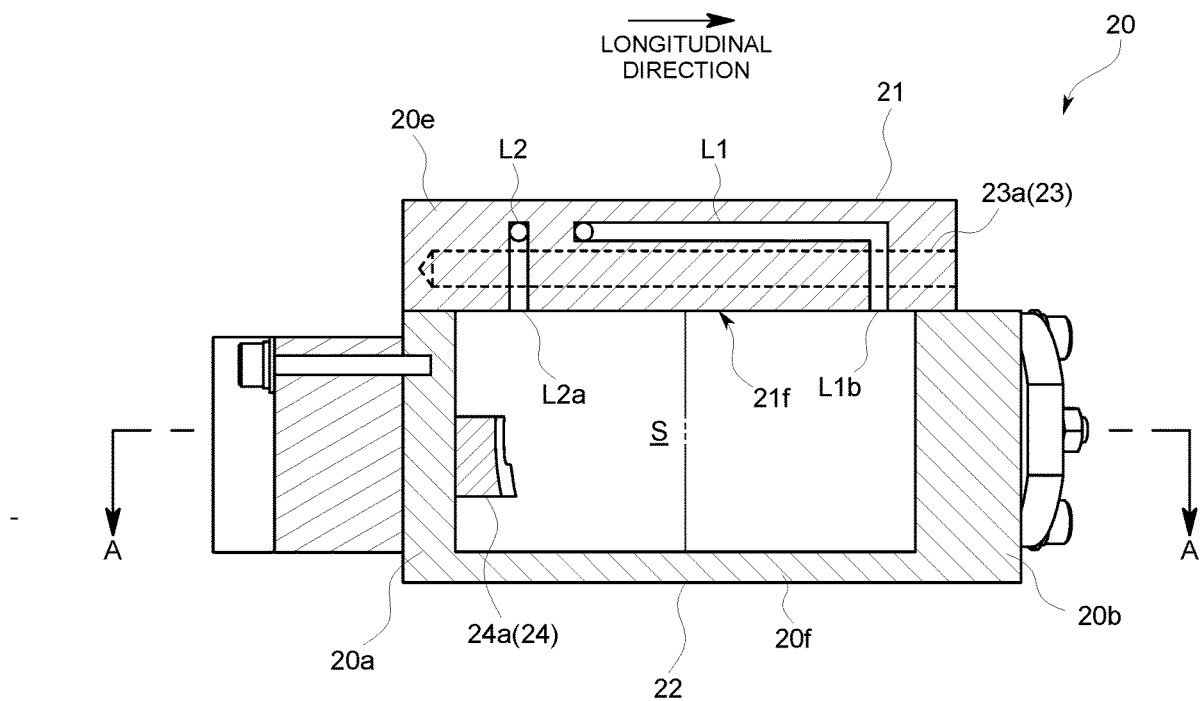
FIG. 3 is a sectional view schematically illustrating the optical cell of the gas analyzer according to the same embodiment, taken along A-A.

As illustrated in FIGS. 2 and 3, the optical cell 20 is a so-called multiple reflection cell of an elongated shape having an inner space S into which gas is introduced. Note that the optical cell 20 of the present embodiment is a substantially rectangular parallelepiped housing having the inner space. The optical cell 20 includes: two cell elements 21 and 22 which form the inner space S; a heating mechanism 23 which is provided in the one cell element 21 included in the two cell elements 21 and 22; and three reflection members which are provided in the other cell element 22. Note that for convenience of explanation, a longitudinal direction of the optical cell 20 is referred to as an anterior-posterior direction, a direction orthogonal to the longitudinal direction of the optical cell 20 is referred to as a horizontal direction, and a direction orthogonal to the anterior-posterior direction and horizontal direction of the optical cell 20 is referred to as a vertical direction in the following.

The two cell elements 21 and 22 form an outer shape of the optical cell 20 and are separable from each other. Note that the optical cell 20 of the present embodiment is a substantially rectangular parallelepiped housing and a front side wall 20a, a rear side wall 20b, a left side wall 20c, a right side wall 20d, an upper side wall 20e, and a lower side wall 20f forming the housing are formed by either of the cell elements 21 and 22.

Figure 4:
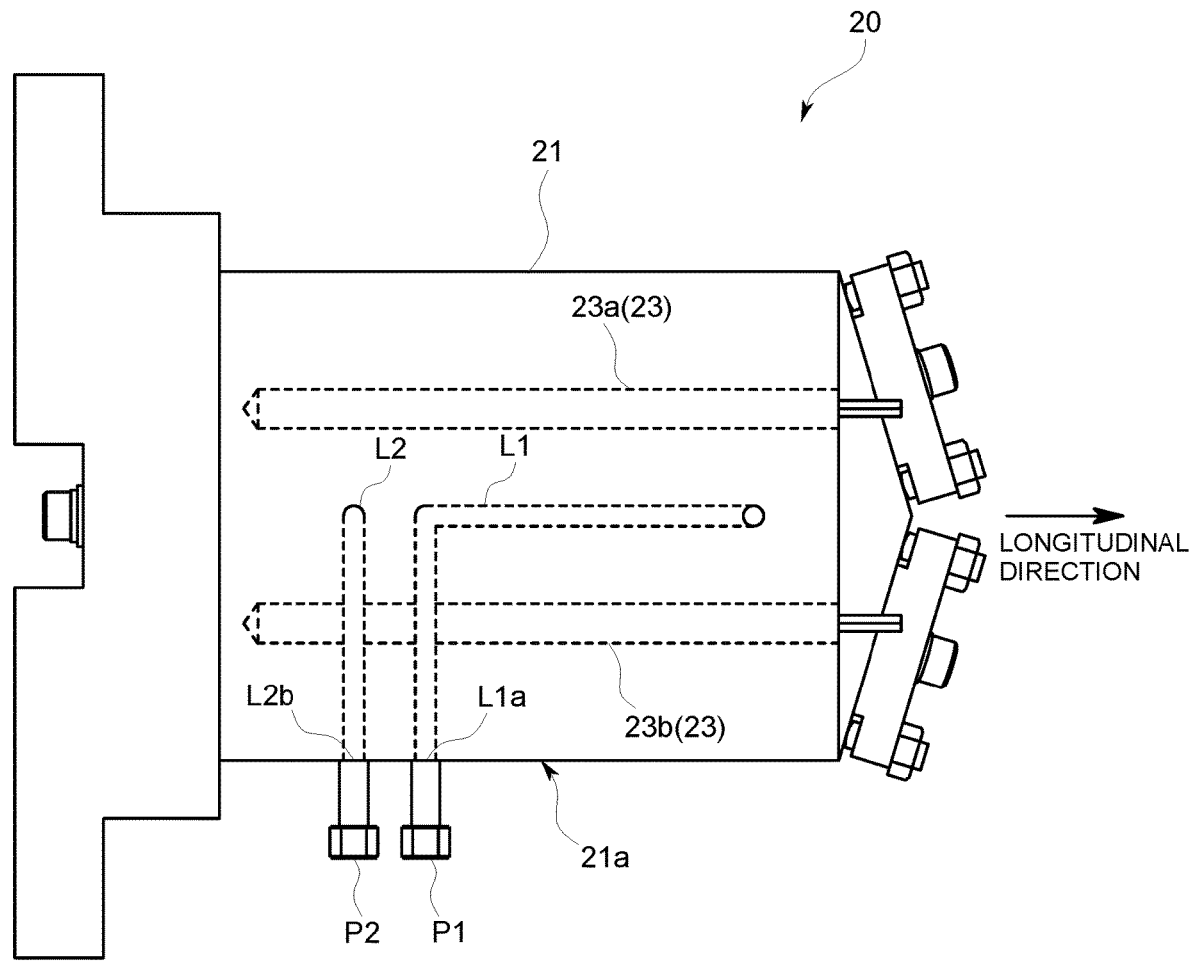
FIG. 4 is a plan view schematically illustrating the optical cell of the gas analyzer according to the same embodiment.

More specifically, as illustrated in FIGS. 3 and 4, the one cell element 21 forms the single side wall (front side wall 20a) forming the housing and extending along the longitudinal direction. Therefore, the one cell element 21 is of a plate-like shape.

The one cell element 21 is provided with: a gas introduction path L1 for guiding gas, which has been introduced from the outside, to the inner space S; and a gas lead-out path L2 for guiding the gas, which has been led out from the inner space S, to the outside. In the present embodiment, the sample gas and purge gas are introduced into the inner space S by the single gas introduction, path L1. Note that another gas such as calibration, gas can be introduced into the inner space S by the gas introduction path L1.

The gas introduction path L1 has an intake port L1a provided on one side (one end side) of the one cell element 21 in the longitudinal direction and has an exhaust port L1b provided on another side (another end side) of the cell element 21 in the longitudinal direction. That is, the gas introduction path L1 is configured in a manner such as to guide the gas, which has been taken in from the intake port L1a, from the one side (one end side) to the another side (another end side) in the longitudinal direction and then discharge the gas from the exhaust port L1b. In other words, the gas introduction path L1 is configured in a manner such as to guide the gas, which has been taken in from the intake port L1a, across a longitudinal center (illustrated in a two-dot chain line in FIG. 3) of the inner space S and then exhaust the gas from the exhaust port L1b.

The gas introduction path L1 of the present embodiment has the intake port L1a provided on a side surface (a left surface 21a) of the one cell element 21 and the exhaust port L1b provided on a surface (a bottom surface 21f) of the one cell element 21 facing; the inner space S. Note that the gas introduction path L1 passes through a path longitudinally extending at a horizontal (widthwise) center in the one cell element 21.

The gas lead-out path L2 has an intake port L2a and an exhaust port L2b each provided on the one side of the one cell element 21 in the longitudinal direction. Consequently provided is a state in which the exhaust port L1b of the gas introduction path L1 communicating with the inner space S and the intake port L2a of the gas lead-out path L2 communicating with the inner space S are arranged separately from each other in the longitudinal direction. That is, the gas introduction path L1 introduces the gas into another side of the inner space S in the longitudinal direction and the gas lead-out path L2 leads out the gas from one side of the inner space S in the longitudinal direction.

The gas lead-out path L2 of the present embodiment has the intake port L2a provided on the surface (bottom surface 21f) of the one cell element 21 facing the inner space S and has the exhaust port L2b provided on the side surface (left surface 21a) of the one cell element 21. Note that the gas lead-out path L2 passes through the path extending in the horizontal direction (widthwise) in the one cell element 21.

Then an introduction port P1 which communicates with the intake port L1a of the gas introduction path L1 and a lead-out port P2 which communicates with the exhaust port L2b of the gas lead-out path L2 are projected from the side surface (left surface 21a) of the one cell element 21. Note that the introduction port P1 and the lead-out port P2 are arranged in a manner such as to be arrayed on the one side of the one cell element 21 in the longitudinal direction.

Moreover, the one cell element 21 is provided with the heating mechanism 23. Note that the heating mechanism 23 adjusts a temperature of the gas introduced into the inner space S through the gas introduction path L1 in a manner such that the temperature is brought closer to a predefined set value (a temperature of the inner space S upon analysis). More specifically, the heating mechanism 23 is a pair of heaters 23a and 23b inserted inside of the cell element 21. Then the heating mechanism 23 heats the entire one cell element 21 whereby the gas flowing through the gas introduction path L1 passing through the inside of the one cell element 21 is also heated. Note that the heating mechanism 23 may be provided in the another cell element 22. Consequently, a temperature change of the gas introduced into the inner space S of the optical cell 20 can be suppressed.

Here, a length of the gas introduction path L1 is set based on passage time of the gas passing through the gas introduction path L1 and a temperature increase value of the gas passing through the gas introduction path L1. More specifically, the passage time is defined by time in which the gas taken in from the intake port L1a of the gas introduction path L1 reaches the exhaust port L1b, the temperature increase value is defined by a difference between the temperature of the gas taken in from the intake port L1a of the gas introduction path L1 and a temperature of the gas exhausted from the exhaust port L1b. Then for the heating mechanism, a heating temperature is set based on the passage time, the temperature increase value, etc. For information, the temperature increase value is preferably set in a manner such that the temperature of the gas exhausted from the exhaust port L1b of the gas introduction path L1 becomes close to the set value.

The another cell element 22 forms the other side walls, more specifically, the front side wall 20a the rear side wall 20b, the left side wall 20c, the right side wall 20d, and the lower side wall 20f, forming the housing. Therefore, the another cell element 22 is formed into a housing which opens in one direction. Then closing the opening of the another cell element 22 with the one cell element 21 forms the inner space S. Note that the one cell element 21 can be screwed into the another cell element 22.

The another cell element 22 has reflection members 24 set on a pair of the side walls (the front side wall 20a and the rear side wall 20b) longitudinally opposing each other, as illustrated in FIG. 2. More specifically, a first reflection member 24a is set on one (the front side wall 20a) of the pair of opposing side walls, and two second reflection members 24b and 24c are set on another one (the rear side wall 20b) of the side walls. Note that the first reflection member 24a and the two second reflection members 24b and 24c have reflection surfaces opposing each other, and the second reflection members 24b and 24c have the reflection surfaces inwardly inclined in a manner such as to be directed towards the first reflection member 24a.

One (the front side will 20a) of the side walls of the another cell element 22, on which the first reflection member 24a is set, are provided with: an entrance window W1 which causes light to enter the inner space S; and an exit window W2 which causes the light to exit from the inner space S. More specifically, the entrance window W1 and the exit window W2 are provided at positions with the first reflection member 24a in between along a direction in which the second reflection members 24b and 24c are arrayed.

The optical cell 20 of the present embodiment is configured such that the light entering from the entrance window W1 enters the second reflection member 24c located in a remote distance when viewed from the entrance window W1. That is, the entrance window W1 is provided in a manner such as to incline while facing the second reflection member 24c located in a remote distance. On the other hand, the exit window W2 is provided in a manner such as to incline while facing the second reflection member 24b located in a distance when viewed from the exit window W2. Alternatively, the entrance window W1 may be provided while facing the second reflection member 24b located in a close distance and the exit window W2 may also be provided while facing the second reflection member 24c located in a close distance. Consequently, the light entering the inner space S from the entrance window W1 is repeatedly reflected between the three reflection members 24 and then exits from the exit window W2.

Second Embodiment

Figure 5:
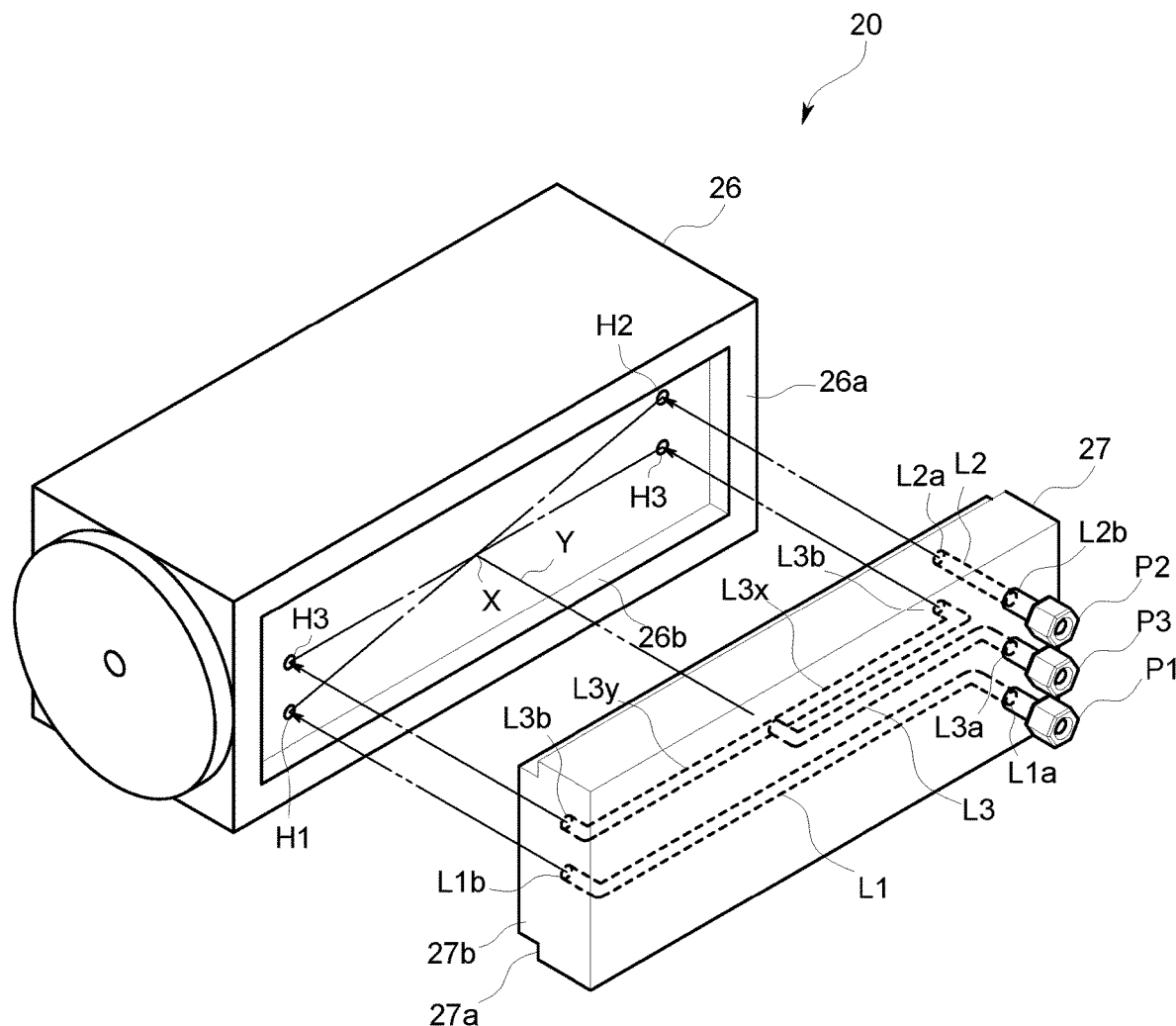
FIG. 5 is an exploded perspective view schematically illustrating an optical cell according to a second embodiment.

The present embodiment is a modified example of the optical cell used in the gas analyzer according to the first embodiment. As illustrated in FIG. 5, the optical cell 20 according to the present embodiment includes: a cell main body 26 which forms an inner space S; and a manifold member 27 which is connected to the cell main body 26 in a manner such as to be separable therefrom. Note that the manifold member 27 includes a heating mechanism (not illustrated) as is the case with the one cell element 21 of the first embodiment. Moreover, the cell main body 26 is a so-called heriot cell which includes a pair of reflection members 24 opposing the inner space S.

The manifold member 27 is of an elongated shape connected to one outer surface 26a of the cell main body 26 extending in the longitudinal direction. The manifold member 27 of the present embodiment has: an opposing surface 27a which opposes the cell main body 26; and a convex part 27b which engages with a concave part 26b provided on the outer surface 26a of the cell main body 26. Consequently, fitting the convex part 27b of the manifold member 27 in the concave part 26b of the cell main body 26 positions the manifold member 27 relative to the cell main body 26.

The manifold member 27 is also provided with: a sample gas introduction path L1 for guiding sample gas, which has been introduced from the outside, to the inner space S; a purge gas introduction path L3 for guiding purge gas, which has been introduced from the outside, to the inner space S; and a gas lead-out path L2 for guiding the sample gas and the purge gas, which have been introduced from the inner space S, to the outside.

The sample gas introduction path L1 has an intake port L1a provided on one side of the manifold member 27 in a longitudinal direction and an exhaust port L1b provided on another side of the manifold member 27 in the longitudinal direction. That is, the gas introduction path L1 is configured in a manner such as to guide the gas, which has been taken in from the intake port L1a, from the one side to the another side in the longitudinal direction and then exhaust the gas from the exhaust port L1b.

The purge gas introduction path L3 has an intake port L3a provided on the one side of the manifold member 27 in the longitudinal direction and an exhaust port L3b provided on the one and the another sides of the manifold member 27 in the longitudinal direction. That is, the purge gas introduction path L3 branches into two branch paths L3x and L3y in the middle. The one branch path L3x, extends towards the one side of the manifold member 27 in the longitudinal direction and the another branch path L3y extends towards the another side of the manifold member 27 in the longitudinal direction.

Note that the purge gas introduction path L3 extends in parallel to the sample gas introduction path L1.

The gas introduction path L2 has both the intake port L2a and the exhaust port L2b provided on the one side of the manifold member 27 in the longitudinal direction. Consequently provided is a state in which the exhaust port L1b of the sample gas introduction path L1 communicating with the inner space S and the intake port L2a of the gas lead-out path L2 communicating with the inner space S are separately arranged in the longitudinal direction in the manifold member 27.

Moreover, the outer surface 26a of the cell main body 26 is provided with: a first through hole H1 corresponding to the exhaust port L1b of the sample gas introduction path L1; two third through holes H3 corresponding to the two exhaust ports L3b of the purge gas introduction path L3; and a second through hole H2 corresponding to the intake port L2a of the gas lead-out path L2. Note that the first through hole H1 and one of the third through holes H3 penetrate towards the one side of the inner space S in the longitudinal direction in the cell main body 26, and the second through hole H2 and another one of the third through holes H3 penetrate towards the another side of the inner space S in the longitudinal direction in the cell main body 26.

In a state in which the manifold member 27 is connected to the cell main body 26, the sample gas introduction path L1 communicates with the first through hole H1, the purge gas introduction path L3 communicates with the two third through holes H3, and the gas lead-out path L2 communicates with the second through hole H2.

Note that in a case where the manifold member 27 connected to the cell main body 26 is rotated through 180 degrees where an axial line Y passing through centers X of straight lines (illustrated by a single-dot chain line in FIG. 5) orthogonal to an outer surface of the cell main body 26 (an opposing surface 27a of the manifold member 27) and linking together pairs of through holes (the first through hole H1 and the second through hole H2 and the both third through holes H3 and H3) is provided as a rotation axis, switching occurs, through the rotation, between the first through hole H1 communicating with the sample gas introduction path L1 and the second through hole H2 communicating with the gas lead-out path L2 and also switching occurs between the third through hole H3 communicating with the one branch path L3x of the purge gas introduction path L3 and the third through hole H3 communicating with the another branch path L3y of the purge gas introduction path L3. Consequently, upon the connection of the manifold member 27 to the cell main body 26, selection can be made on which of positions (the one side or the another side) each of ports P1 to P3 set in the manifold member 27 is arranged with respect to the longitudinal direction of the cell main body 26. As a result, a degree of freedom in the connection to each device of the gas analyzer 10 increases. Note that the straight lines linking together the pairs of through holes (the first through hole H1 and the second through hole H2 and the two third through holes H3 and H3) have the centers X overlapping each other.

Other Embodiments

Figure 6:
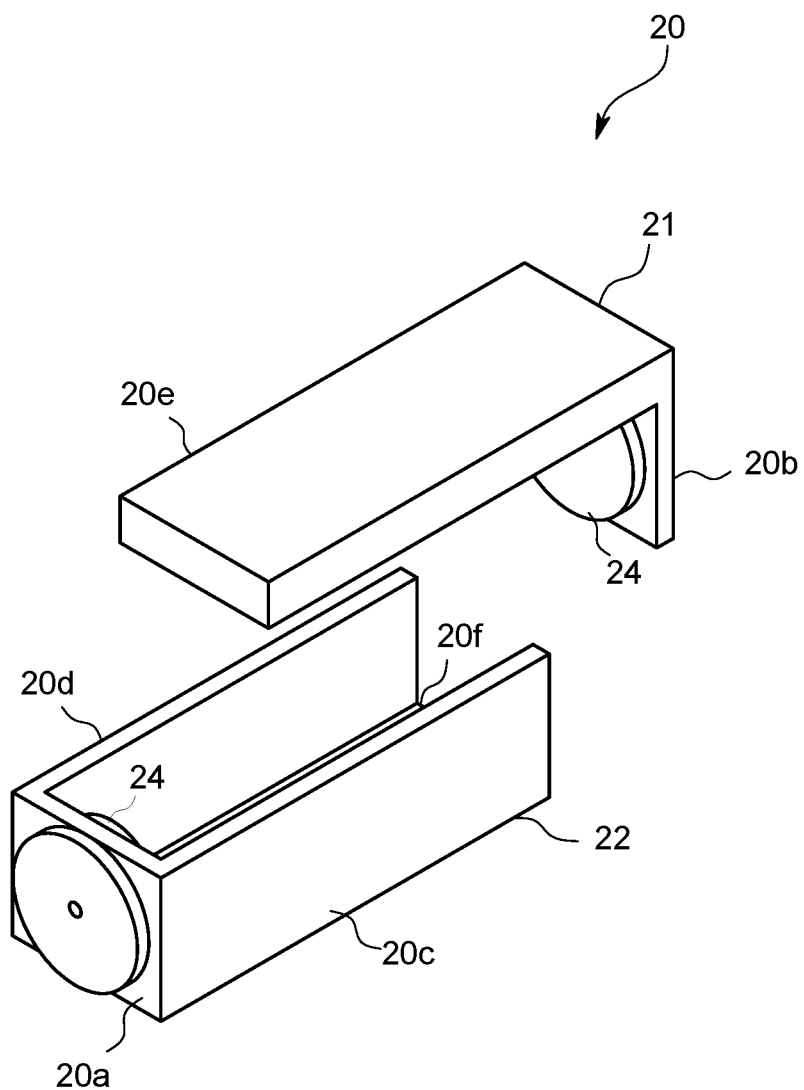
FIG. 6 is a pattern diagram illustrating one cell element and another cell element according to another embodiment.

In the first and second embodiments, the one cell element 21 is formed with the single side wall (the upper side wall 20e) and the another cell element 22 is formed with the other five side walls (the front side wall 20a, the rear side wall 20b, the left side wall 20c, the right side wall 20d, and the lower side wall 20f). The present invention is not limited to such configuration. For example, as illustrated in FIG. 6, the one cell element 21 may be formed with the upper side wall 20e and the rear side wall 20b and the another cell element 22 may be formed with the other four side walls (the front side wall 20a, the left side wall 20c, the right side wall 20d, and the lower side wall 20f). In this case, if a heriot cell is provided as the optical cell 20 as is the case with the optical cell 20 of the second embodiment, one of reflection members is provided at the one cell element 21 and another one of the reflection members is provided at the another cell element 22. As described above, the one cell element 21 may be configured in a manner such as to include at least the one side wall extending along the longitudinal direction. Such configuration permits the gas introduction path L1 to extend along the longitudinal direction and can provide a long zone for heating the gas passing through the gas introduction path L1 by the heating mechanism.

Figure 7A:
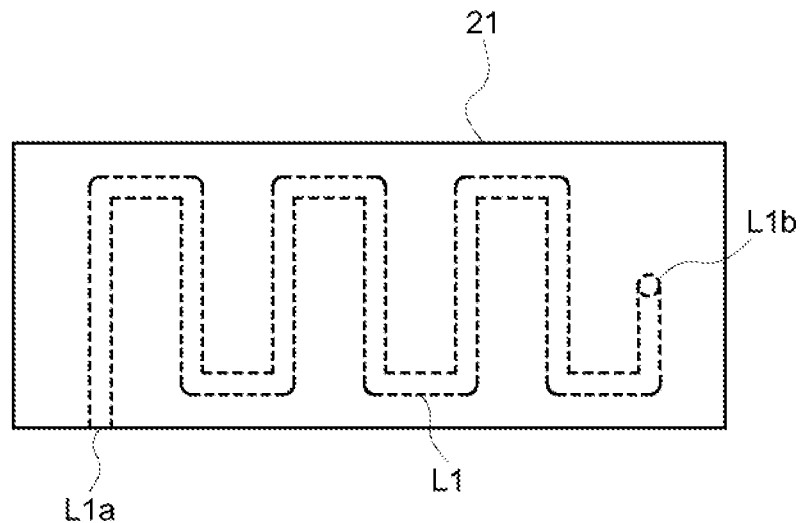
FIGS. 7(*a*) and 7(*b*) are pattern diagrams each illustrating the one cell element according to another embodiment.
Figure 7B:
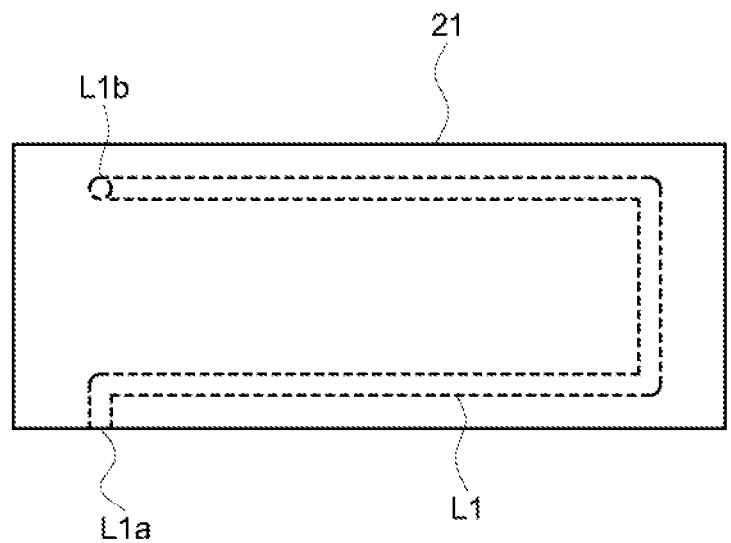

Moreover, the gas introduction path L1 of the first embodiment may be configured in a manner such as to guide the gas, which has been taken in from the outside, from the one side to the another side of the one cell element 21 in the longitudinal direction and then introduce the gas into the inner space S. Therefore, for example, as illustrated in FIG. 7(a), the gas introduction path L1 may be configured in a manner such as to guide the gas, which has been taken in from the intake port L1a provided on the one side of the one cell element 21 in the longitudinal direction, towards the another side while making the gas wind and then introduce the gas from the exhaust port L1b provided on the another side of the one cell element 21 in the longitudinal direction into the inner space S. Alternatively, as illustrated in FIG. 7(b), the gas introduction path L1 may be configured in a manner such as to guide the gas from the intake port L1a provided on the one side to the another side of the one cell element 21 in the longitudinal direction, guide the gas to the one side again, and then introduce the gas from the exhaust port L1b provided on the one side into the inner space S. As described above, for the gas introduction path L1, no limitations are put on a path provided in the middle for guiding the gas, taken in from the outside, from the one side to the another side of the cell element 21 in the longitudinal direction and a path provided after the gas guidance from the one side to the another side.

Moreover, the multireflection cell is illustrated as an embodiment of the optical cell 20 in each of the embodiments described above, but the optical cell 20 according to the present invention can also be used for a so-called one pass type gas analyzer which has a light source 10 set on one end side of the optical cell 20 and a light detector 30 set on another end side of the optical cell 20, and the optical cell 20 makes light emitted from the light source 10 enter the inner space S and then detects, with the light detector 30, the light which has passed through the inner space S without reciprocation in the inner space S.

Moreover, in the first embodiment, the optical cell 20 is formed with the two cell elements 21 and 22 but may be formed with three or more cell elements.

Although gas analyzer 100 has been described as using the NDIR method in the above embodiment, another measurement principle may be used. For example, the gas analyzer according to the present invention may use an FTIR method or an NDUV method.

The embodiment has been described above, referring to the case where the light source is a quantum cascade laser (QCL) as one type of a semiconductor laser, but the light source may be a semiconductor laser other than the quantum cascade laser. Moreover, the light source does not necessarily have to be a semiconductor laser and may be, for example, a lamp using a filament or may be an LED light source. Further, the light source is not limited to the one which emits mid-infrared light but may be the one which emits near infrared light or far infrared light or may be the one which emits ultraviolet light.

The configurations of all the embodiments described above can be applied to a so-called heriot cell and a so-called white cell.

It is needless to say that the present invention is not limited to the embodiments described above and various modifications can be made to the present invention within a range not departing from the spirits of the present invention.

REFERENCE SIGNS LIST

100 Gas analyzer
10 Light source
20 Optical cell
21 One cell element
22 Another cell element
23 Heating mechanism
26 Cell main body
26a Outer surface
27 Manifold member
H1 First through hole
H2 Second through hole
H3 Third through hole
L1 Gas introduction path (Sample gas introduction path)
L2 Gas lead-out path
L3 Purge gas introduction path
30 Light detector
40 Information processor

The invention claimed is:

1. A cell having an inner space into which gas is introduced, the cell comprising:
a cell main body forming the inner space;
a manifold member having an opposing surface that opposes the cell main body; and
a heating mechanism configured to heat the manifold member, wherein
the opposing surface is connected to an outer surface of the cell main body,
the cell main body has a through hole penetrating from the outer surface into the inner space,
the manifold member has at least one gas introduction path formed within the manifold member and extending to run along the outer surface of the cell main body and configured to guide the gas, which has been taken in from outside to the inner space through the through hole, and
the heating mechanism is provided along the at least one gas introduction path.

2. The cell according to claim 1, wherein
the cell main body has a second through hole,
each of the through holes are arranged separately from each other in a longitudinal direction, and
the manifold member further has a gas lead-out path configured to lead out the gas, which has been introduced into the inner space, to the outside through another one of the through holes.

3. The cell according to claim 2, wherein
the gas lead-out path and the at least one gas introduction path have, on either one side of the manifold member in the longitudinal direction, one end communicating with the outside.

4. The cell according to claim 1, wherein
the at least one gas introduction path comprises a plurality of gas introduction paths,
the manifold member has two gas introduction paths, one of which is a sample gas introduction path configured to guide sample gas and another one of which is a purge gas introduction path configured to guide purge gas, and
the heating mechanism heats the sample gas introduction path and the purge gas introduction path.

5. The cell according to claim 4, wherein
the purge gas introduction path branches, in a middle, into two branch paths one of which is configured to guide the purge gas to either one side of the inner space in a longitudinal direction and another one of which is configured to guide the purge gas to another side of the inner space in the longitudinal direction.

6. The cell according to claim 2, wherein
the manifold member is configured to be rotated through 180 degrees where an axial line passing through a center of a straight line being orthogonal to the outer surface of the cell main body and linking together the through holes is provided as a rotation axis such that switching occurs, through the rotation, between the through hole communicating with the at least one gas introduction path and the through hole communicating with the gas lead-out path.

7. A cell having an inner space into which gas is introduced, the cell comprising:
at least two cell elements forming the inner space; and
a heating mechanism configured to heat one of the at least two cell elements, wherein
the one of the at least two cell elements has an opposing surface that opposes another of the at least two cell elements, and has at least one gas introduction path formed within the one of the at least two cell elements and configured to guide the gas, which has been taken in from outside to the inner space,
the opposing surface is attached to an outer surface of the another of the at least two cell elements, and
the heating mechanism is provided along the at least one gas introduction path.

8. The cell according to claim 7, wherein
the one of the at least two cell elements further has a gas lead-out path configured to guide the gas, which has been introduced into the inner space, to the outside, and
one end of the at least one gas introduction path and one end of the gas lead-out path both of which communicate with the inner space are arranged separately from each other in a longitudinal direction of the one of the at least two cell elements.

9. A gas analyzer comprising:
the cell according to claim 1;
a light source configured to emit light towards the inner space of the cell;
a light detector configured to detect the light emitted from the inner space; and
an information processor configured to analyze the gas based on a light intensity signal detected by the light detector.

10. A gas analyzer comprising:
the cell according to claim 7;
a light source configured to emit light towards the inner space of the cell;
a light detector configured to detect the light exiting from the inner space; and an information processor configured to analyze the gas based on a light intensity signal detected by the light detector.

\* \* \* \* \*